Feb. 7, 1967  S. L. SIMONS  3,303,254
METHOD FOR PREPARING A MEMBRANE
Filed June 27, 1963
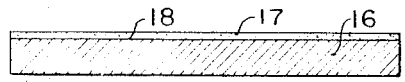
FIG. 1
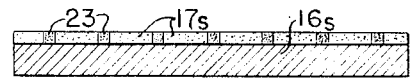
FIG. 7
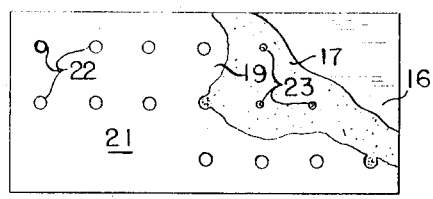
FIG. 2
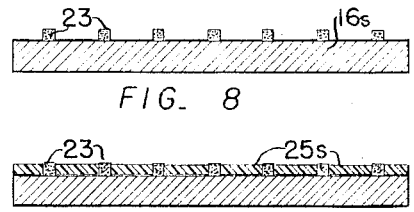
FIG. 8
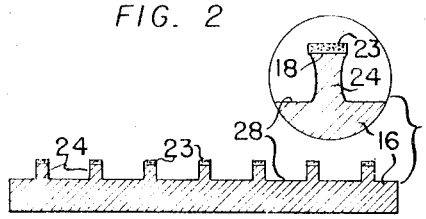
FIG. 3
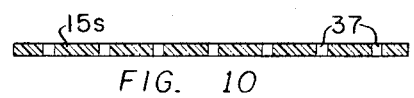
FIG. 9
FIG. 4
FIG. 5
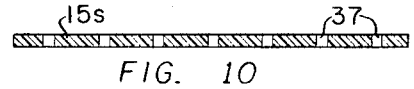
FIG. 10
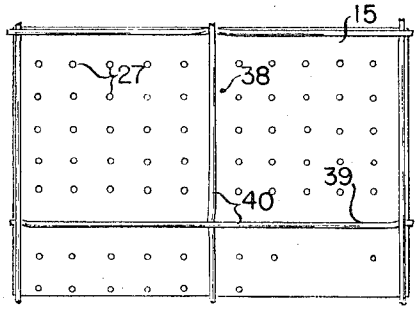
FIG. 11
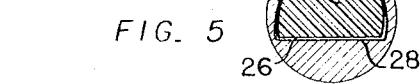
FIG. 6
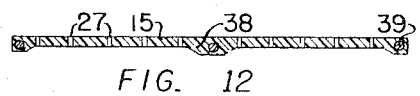
FIG. 12
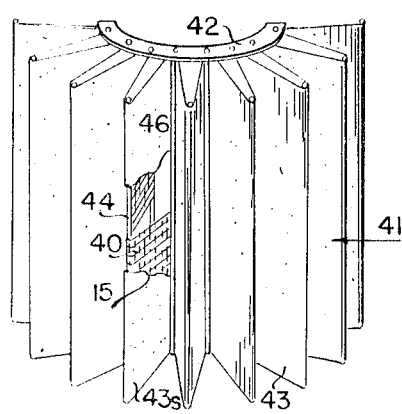
FIG. 13
INVENTOR
SANFORD L. SIMONS
BY
ATTORNEY United States Patent Office 3,303,254
Patented Feb. 7, 1967

3,303,254
METHOD FOR PREPARING A MEMBRANE
Sanford L. Simons, Box 78, Star Route, Morrison, Colo. 06763, assignor of one-half to C. B. Messenger, Jefferson County, Colo.
Filed June 27, 1963, Ser. No. 295,582
6 Claims. (Cl. 264—219)

The present invention relates to a filter membrane and to a method and means for the production of such membrane.

The present disclosure is related to the disclosure previously set forth in patent application Serial No. 122,856, now abandoned.

Previously, many different types of filter materials or filter membranes have been made, designed and used for a wide variety of applications. Because there are many applications and usages for filter membranes, a great deal of research has gone into the design and fabrication of specialty type membranes. Among the major objects of previous research has been the provision of a membrane having ultra small openings therethrough. Another field of research has been directed to the production of filters having a plurality of openings that are of a regulated and uniform size. It has been generally recognized that a filter membrane which had openings of a regulated and uniformly ultra small size in which the openings are in predeterminable patterned disposition would be especially desirable. Further design considerations which may be of importance are high permeability, substantial resistance to mechanical or chemical destruction, and for some applications it is desirable that a membrane be chemically inert and non-irritating with respect to its intended usage.

These previous objectives of the filter industry are of prime importance, and it is an overall objective of the present invention to provide a further answer to many of these problems. One specific object of this invention is to provide a filter membrane which has patterned or uniformly spaced pore openings of a regulated micronic size.

A further object is to provide a membrane formed of a durable, chemically inert, non-reactive and non-irritating material that may be used for various conventional filter purposes as well as for specific applications in the biological field of tissue culture.

Another object of this invention is to provide a filter membrane formed of a plastic or resin material, such as Teflon, which has pore openings of micronic size.

A still further object of this invention is to provide a durable filter membrane which can be designed for use with associated equipment to withstand high mechanical stresses resulting from high pressures, abrasion or mechanical shock.

Another object of this invention is to provide a filter membrane which may be utilized for the selective filtration of substances, compounds, chemicals, vital organisms, antibodies and viruses.

Another object is to provide a membrane having separate pore openings of a novel shape to obtain high flow and permeability characteristics.

A further object of this invention is to provide a method and means for the manufacture and production of such desirable filter membranes.

Further objects and advantages of the present invention will be apparent from the appended description and drawings, in which FIG. 1 is a side elevation showing a photo sensitive emulsion on a support plate, FIG. 2 is a top plan view in broken section showing said emulsified plate with an exposure screen or lattice disposed thereabove, FIG. 3 is a side cross-sectional elevation with an associated segment shown in enlarged detail to illustrate said plate after it has been etched, FIG. 4 is a cross-sectional elevation showing the use of the processed plate of FIG. 3 as a casting bed or mold for a resinous material membrane, FIG. 5 is an enlarged detail showing features of said invention associated with the heat curing of said membrane, FIG. 6 is a cross-sectional elevation of a resulting filter membrane, FIG. 7 is the first of a group of figures showing a separate method of manufacture, the further steps of which are shown in FIGS. 8, 9 and 10; specifically, FIG. 7 shows an exposed photo sensitive emulsion on a supporting plate, FIG. 8 shows the removal of non-exposed emulsion, FIG. 9 shows usage of the structure of FIG. 8 as a casting bed, and FIG. 10 shows the filter membranes resulting from this process, FIG. 11 is a plan view showing the cooperative spacing of pore openings, membrane reinforcing webs, and screen wire support members, FIG. 12 is a cross-sectional elevation showing embedded screen wire reinforcing, FIG. 13 shows usage of a filter membrane made in accordance with this invention in a conventional form of filter apparatus.

Briefly stated, the present invention relates to a filter membrane having discrete openings of minute size disposed in regulated or patterned positions each to each in which the size of the openings is likewise regulated and/or uniform. The resulting membrane is preferably made of a resinous or plastic material which should be non-reactive or non-irritating with respect to the materials to be filtered. The invention further encompasses the method of deriving the desired filter membrane. This method includes the use of a photo lithographic type of process to obtain a casting bed or mold upon which the desired membrane may be formed and cured. Patterned arrangements for the disposition of the pore openings are used for many purposes, including the improvement of the mechanical strength of the membrane. A significant development within the scope of this invention is the provision of a filter membrane especially adapted for use in the realm of viable tissue culture.

Detailed features of separate embodiments of the invention and of various methods and means for the accomplishment of the foregoing objectives may be described in greater detail with reference to the accompanying drawings, in which FIGS. 1 through 6 represent a first embodiment of this invention. In order to derive the desired filter membrane 15, it is seen in FIG. 1 that a metal plate 16 is provided having a photo sensitive emulsion 17 on its upper surface 18. In FIG. 2 the plate 16 is covered with a lattice, screen or negative 19, the general surface 21 of which is relatively opaque. However, light transmitting areas, openings or dots 22 are disposed in uniformly spaced or regulated relation on said screen 19. While the derivation of the described screen, lattice or negative is of extreme importance to the proper exercise of this invention, it is at present sufficient to state that the size and spacing of said dots 22 or light openings may be extremely minute. In some instances, the dots may be of the order of one micron in dimension.

With the use of such a screen 19 disposed either in contact relation, as shown, or in out-of-contact relation when light projection apparatus is used, the light sensitive emulsion 17 is exposed to a light source of an intensity as desired to photo sensitively (or chemically) change the condition of the emulsion materials at the exposed positions. This change results in a hardened segment or photo-resist cap 23 at the position of the light openings or dots 22. The actual size of the dots is controlled by processes and techniques known to the photo engraving industry involving changes in timing, light intensity, relative positioning and other variables. After exposure the screen 19 is removed, and then the entire plate 16 is washed to remove the non-exposed emulsion to leave the spaced photo-resist caps 23 on the upper plate surface 18.

As a next step, shown in FIG. 3, the plate 16 is subjected to an etching process so that the surface 18 of the plate 16 is eroded away in all positions that are not protected by the spaced caps 23. When the etching process has continued to the desired extent, a plurality of posts 24 will be formed in raised position above the resulting new top surface 28. The etching process may be regulated by adjusting the time of exposure to the etching solution or by changing the strength thereof to obtain the desired height and shaping for the posts 24.

Next, as is shown in FIG. 4, a plastic, resinous or otherwise moldable material 25 having the desired film characteristics is poured or placed on the top surface 28 until the thickness of the material 25 corresponds to or is less than the height of the posts 24.

Some materials usable in the practice of this invention may well be self-curing or of an air-drying type. For other desirable materials, further processing is necessary. It has been noted that in cases where a heat cure is required, further beneficial results are obtained. Teflon compounds (polytetrafluoroethylene) have been found to have very beneficial properties when used as the film material 25 in the practice of this invention. The curing of Teflon compounds which may be placed on the casting bed or mold in liquid dispersion form requires the application of elevated temperatures. It has been noted that when the entire plate and the uncured Teflon are raised to the curing temperature of approximately 600° F. an oxide film 26 forms at the interface between the surface 28 of the plate 16 and the deposited Teflon. This oxidation zone 26 aids materially in separating the cured membrane 15 and plate 16. Accordingly, a Teflon filter membrane 15 which is itself resilient may easily be removed from the posts 24 even though an acid etch process has partially undercut the posts 24, as shown in the enlarged detail of FIG. 3 and as further shown in FIGS. 5 and 6. In fact, the formation of the oxide coating 26 and the acid undercutting of the posts 24 makes it possible to provide a filter member 15, as shown in FIG. 6, in which the filter openings 27 have a distinctive nozzle shape which improves the flow characteristics for materials passing through the membrane openings 27.

A separate method for obtaining the desired type membrane is shown in FIGS. 7 through 10. Here it is seen that a photo resist emulsion 17s is provided which is supported on a plate 16s. This emulsion is exposed as in the previous instance to provide hardened photo resist caps 23. As a subsequent step, the emulsion 17s is next subjected to washing which removes all of the non-hardened portion thereof to leave the upstanding caps 23 in place on the support plate 16s.

The essential difference between this and the previous embodiment is the plate 16s itself is not etched and the casting bed is provided solely by the emulsion. In fact, it is possible to obtain a useful casting bed and mold without the use of any supporting metal plate when commercially used types of rotogravure emulsions and processes are used. The end product is derived as in the previous embodiment by depositing a film 25s of material about the resist caps 23 and subsequently curing the film 25s to obtain a membrane 15s having a plurality of openings 37 therethrough. The membrane made by this later described process is easier to separate from the support plate, but it is still found that the oxide coating resulting from the heat curing of materials does aid in the removal of the membrane.

Where pore openings of micronic size in the range down to one micron are desired, it is difficult to provide a post structure 24 that extends very high above its effective base. This is true because of the fact that the acid etching process tends to completely undercut the post if too high a bas-relief is desired. Because of this limitation on the height of the post, the thickness of the membrane is itself limited.

In order to obtain adequate mechanical strength for the membrane, it is desirable to cooperatively arrange the openings 27 into patterned groupings so that web reinforcing areas 38 intersect and interrupt the perforated pattern. See FIG. 11. Where the membrane is to be subjected to higher mechanical loadings due to high pressures or other factors, it has been found desirable to cooperatively arrange these web elements so that they can be made to coincide with the cross wires 39 of a filter screen 40. By this system the greater mechanical strength of the screen 40 may be used to support and increase the usefulness of the membrane 15. Actually the screen 40 may itself be embodied in the membrane 15 by the simple expedient of placing the screen 40 over the casting bed 16 prior to placement of the film material and the curing thereof. If desired, the plate 16 may be previously etched or undercut in positions corresponding to the position of the web 38 to receive the cross wires 39 of the screen 40 or simply to make the web members 38 thicker in such areas. This features is shown in FIG. 12.

Adaptation of this derived filter membrane to a conventional type of filter structure is shown in FIG. 13. Here it will be seen that a filter cartridge 41 which has a central collector opening 42 is surrounded by a filter element having an increased surface area by reason of the convoluted pattern of the segments 43. The structure of each of these segments is similar to that shown for the segments 43s where the screen wire 40 is shown to be threaded about the outer support rods 44 and inner support rods 46. Once the screen wire has been placed, a membrane element made in accordance with this invention is disposed exteriorly thereof so that when the filter 41 is exposed to pressure, such pressure will act first against the membrane 15 and will be resisted and opposed by the inwardly disposed screen wire 40.

At the present time the maximum size for the pore openings that will give a desired selective filtration is unknown, but it is believed that such maximum size of pore opening will be greater than one micron. Likewise, the ratio of exposed area to closed and protected area is not yet definitely known, and accordingly the minimum spacing of pore openings each to each is not known. This spacing and the size of pore openings, of course, is directly related to the ratio of permeability of the membrane, which ratio of permeability will be of importance in other membrane applications as well as this described medical usage.

Present techniques with commercially available exposure screens 19 have resulted in the production of membranes having pore openings of three microns spaced at a center-to-center distance of twenty-five microns. This membrane was produced by use of a half-tone screen having 1,000 lines per inch. If closer spacing is necessary, screens of even greater definition could be obtained.

It is considered to be entirely possible to derive halftone screens having a definition of at least two thousand lines per inch using refinements of present techniques. Since a two thousand line screen would provide a fourfold increase in permeability, it is believed that most filtration requirements may be met by membranes made according to the present description. A major problem is in the reduction of pore opening size. If reduction in the size of pore openings is necessary, it is believed that more accurate exposure and etching techniques may make such size reduction possible.

While separate embodiments of the invention have been shown and described and, further, while specific uses of the membrane derived have been indicated, it will be obvious that the method and process and, in fact, the membranes themselves are adaptable to many and varied changes. All such changes and modifications as come within the scope of the hereunto appended claims are considered to be a part of this invention.

I claim:

1. The method for making a membrane having discrete openings of defined size and shape and selective placement therethrough which comprises selectively exposing a photo lithographic plate to light in patterned disposition to create hardened spots on said plate in positions corresponding to points of light impingement, chemically etching said plate to remove plate materials from non-hardened surfaces thereof whereby hardened posts thereof will be disposed in bas relief above the plane of surrounding depressions, depositing a film of resin plastic moldable material on the etched face of said plate to fill said depressions to a depth less than the height of said posts, curing said resin material, and separating said plate and resin material whereby a filter membrane is obtained having spaced openings therethrough in positions corresponding to the position of the posts on the face of said photo lithographic plate mold.

2. The method for making a filter membrane having openings therethrough of regulated size and spacing which comprises depositing a photo-sensitive photolithographic process type of emulsion on a supporting plate, selectively exposing said photo-sensitive emulsion to light of patterned disposition to change the chemical composition of the light exposed portion of said emulsion, selectively dissolving away the non-changed part of said emulsion to leave photo-resistant caps as prominences above the plane of said plate in positions corresponding to the pattern of light exposure, depositing a resinous plastic moldable material on said plate used as a casting bed and about said photo-resist prominences to a thickness less than the height of said prominences, curing said resinous plastic material to derive a sheet membrane structure, and removing said cured membrane from the plate casting bed for usage whereby openings through said membrane of size and placement corresponding to the size and positioning of said photo-resist prominences and the original pattern of light exposure are obtained.

3. The method as set forth in claim 2 wherein the general area of said plate and said photo-sensitive emulsion is masked with a screen having light openings of regulated size and placement therein previous to said light exposure step whereby the patterned disposition of said light is regulated by the positioning of said openings.

4. The method as set forth in claim 2 wherein the surface of said plate is chemically etched after establishment of said photo-resist cap prominences to provide a depressed surface for said plate between the prominences.

5. The method as set forth in claim 2 wherein said plate is of a type subject to surface oxidation and wherein the curing of said membrane material is accomplished by the application of supplementary heat to establish an oxide interface between said plate and filter membrane facilitating the removal thereof.

6. The method as set forth in claim 4 wherein said chemical etching is continued until the photo-resist prominences are undercut by the etching process and wherein the resinous plastic moldable material is of a resilient type, and inclusive of the further step of removing said resilient cured membrane from its casting bed and elastically over the undercut prominences, whereby tapered openings are provided in said membrane.

References Cited by the Examiner

UNITED STATES PATENTS

| | | | |
|---|---|---|---|
| 1,519,004 | 12/1924 | Muller | 96—35 |
| 1,532,188 | 4/1925 | Krakes | 96—35 |
| 2,197,805 | 4/1940 | Lovett | 210—500 X |
| 2,226,381 | 12/1940 | Norris | 210—498 X |
| 2,232,153 | 2/1941 | Vohrer | 210—500 X |
| 2,573,639 | 10/1951 | Coler | 210—500 X |
| 2,788,125 | 4/1957 | Webb | 210—497 |
| 2,957,200 | 10/1960 | Pufahl. | |
| 2,982,416 | 5/1961 | Bell | 210—498 |
| 3,121,009 | 2/1964 | Giaimo | 96—35 X |

FOREIGN PATENTS 13,518  1907  Great Britain.

LEON D. ROSDOL, *Primary Examiner.*

JULIUS GREENWALD, *Examiner.*

M. WEINBLATT, *Assistant Examiner.*